United States Patent [19]

O'Neill et al.

[11] Patent Number: 5,055,199
[45] Date of Patent: * Oct. 8, 1991

[54] METHOD FOR REDUCING THE AMOUNT OF ANIONIC METAL-LIGAND COMPLEX IN A SOLUTION

[75] Inventors: Gary A. O'Neill; Chanakya Misra, both of Plum Borough; Abraham S. C. Chen, Franklin Park Township, all of Pa.

[73] Assignee: Aluminum Company of America, Pittsburgh, Pa.

[*] Notice: The portion of the term of this patent subsequent to Sep. 19, 2006 has been disclaimed.

[21] Appl. No.: 413,627

[22] Filed: Sep. 28, 1989

Related U.S. Application Data

[63] Continuation-in-part of Ser. No. 118,711, Nov. 9, 1987, Pat. No. 4,867,882.

[51] Int. Cl.$^5$ ................................................ C02F 1/28
[52] U.S. Cl. ..................................... 210/684; 210/688; 210/904; 423/25; 423/29; 502/415
[58] Field of Search ............... 210/681, 684, 685, 688, 210/904, 660; 75/1.18 R; 423/25.29; 502/414, 415

[56] References Cited

U.S. PATENT DOCUMENTS

| | | | |
|---|---|---|---|
| 3,539,306 | 11/1970 | Kumura et al. | 23/315 |
| 4,026,784 | 5/1977 | Rivers | 204/273 |
| 4,039,327 | 8/1977 | Dietz Jr. et al. | 75/108 |
| 4,092,154 | 5/1978 | Dietz Jr. et al. | 75/109 |
| 4,111,766 | 9/1978 | Idota et al. | 204/109 |
| 4,157,434 | 6/1979 | Floryan et al. | 526/71 |
| 4,166,781 | 9/1979 | Staples | 204/109 |
| 4,264,373 | 4/1981 | Shinbori et al. | 127/55 |
| 4,394,354 | 7/1983 | Joyce | 423/25 |
| 4,396,585 | 8/1983 | Rosene | 423/25 |
| 4,458,026 | 7/1984 | Reichle | 502/80 |
| 4,458,030 | 7/1984 | Manabe et al. | 502/183 |
| 4,537,686 | 8/1985 | Borbely et al. | 210/713 |
| 4,547,620 | 10/1985 | Miyata et al. | 585/852 |
| 4,642,193 | 2/1987 | Miyata et al. | 210/682 |
| 4,656,156 | 4/1987 | Misra | 502/415 |
| 4,752,397 | 6/1988 | Good | 210/662 |
| 4,867,882 | 9/1989 | O'Neill et al. | 210/684 |

FOREIGN PATENT DOCUMENTS 79-024993 8/1979 Japan.
61-133190 6/1986 Japan.

OTHER PUBLICATIONS

Definition of "ligand" from Hawley's Condensed Chemical Dictionary, 11th ed., p. 699 (1987).
"Properties of a Synthetic Magnesium-Aluminum Carbonate Hydroxide & Its Relationship to Magnesium-Aluminum Double Hydroxide Manasseite & Hydrotalcite", The American Minerologist, vol. 52, Jul.-Aug. 1967, pp. 1036-1047—G. J. Ross et al.
"Recovery Process for Complexed Copper-Bearing (List continued on next page.)

Primary Examiner—Stanley Silverman
Assistant Examiner—Christopher Upton
Attorney, Agent, or Firm—Gary P. Topolosky

[57] ABSTRACT

A method for reducing the amount of anionic metal-ligand complex in a solution comprises: (a) contacting the solution with a substance selected from: a compound having the formula: $A_wB_x(OH)_yC_z \cdot nH_2O$, wherein A represents a divalent metal cation, B represents a trivalent metal cation, C represents a mono- to tetravalent anion, and w, x, y, z and n satisfy the following: $0 \leq z \leq x \leq 4 \leq w \leq \frac{1}{2}y$ and $12 \geq n \geq \frac{1}{2}(w-x)$; a calcined product of said compound and mixtures thereof; and (b) separating the substance from the solution. A method for removing substantially all metal-cyanide, -thiocyanate, -thiosulfate, -citrate and/or -EDTA complex from a solution containing one or more of said complexes is also disclosed. The latter method comprises contacting the solution with a sufficient amount of substance consisting essentially of a compound selected from: hydrotalcite, calcined hydrotalcite and mixtures thereof; and separating the substance from the solution.

22 Claims, 5 Drawing Sheets

OTHER PUBLICATIONS

Rinse Waters", R. M. Spearot et al., *Environmental Progress*, vol. 3, No. 2, May 1984, pp. 124-128.

"Intercalation of Organic & Inorganic Anions into Layered Double Hydroxides", K. Chibwe et al., *J. Chem. soc., Chem. Commun.*, 1989, pp. 926-927.

"Adsorption of Various Anions by Magnesium Aluminum Oxide ($Mg_{0.7}Al_{0.3}O_{1.15}$)", T. Sato et al., *Ind. Eng. Chem. Prod. Res. Dev.*, vol. 25, No. 1, Mar. 1986, pp. 89-92.

Alcoa Specialty Adsorbent Products—Bulk Media Product Data Sheet, vol. 1, No. 1, "Sorbplus TM Anion Adsorbent".

Alcoa Specialty Adsorbent Products—Bulk Media Product Data Sheet, vol. 1, No. 4, "Sorbplus TM for Treatment of Metal Finishing Waste".

METHOD FOR REDUCING THE AMOUNT OF ANIONIC METAL-LIGAND COMPLEX IN A SOLUTION

This application is a continuation-in-part of application Ser. No. 07/118,711, filed Nov. 9, 1987, now U.S. Pat. No. 4,867,882, the disclosure of which is fully incorporated by reference herein.

BACKGROUND OF THE INVENTION

This invention relates to a method for reducing the amount of anionic metal-ligand complex in a solution containing the complex. The invention also relates to a method for removing metal-ligand complexes from waste water to make the water environmentally more acceptable. Particularly, the invention relates to a method for removing substantially all metal-cyanide, metal-thiocyanate, metal-thiosulfate, metal-citrate and/or metal-ethylenediamine tetraacetic acid (EDTA) complex from a solution containing one or more of the same.

Cyanides have been used for many years in such industries as metal electroplating, electroless plating and the recovery of precious metals from ores. As a result of such industrial uses, substantial amounts of waste water containing complexes of metal-cyanides, or their related cyanate or thiocyanate ionic species, are generated daily. Gold mining, alone, accounts for a large proportion of contaminated waste water streams.

Through the years, several methods have been proposed for removing metal-cyanide complexes from industrial solutions. Although these methods may be operable, they are also usually accompanied by serious practical or commercial disadvantages, including high operating costs, complicated equipment requirements or careful processing controls of the kind which are not customarily available at remote mine sites or at many water treatment facilities. In U.S. Pat. No. 4,092,154, there is disclosed a method for precipitating precious metal ions from a metal-cyanide-containing solution. The method proceeds by adding to the solution an admixture of aluminum powder and reducing agent selected from alkali metal hydrosulfite, alkali metal borohydride and a hydrazine. Alternatively, U.S. Pat. No. 4,537,686 teaches a method for lowering the total cyanide content of an aqueous effluent by treating the waste water at a pH between about 5-12 with an oxygen-containing gas, copper catalyst and reagent selected from: $SO_2$ and an alkali, or alkali earth metal, sulfite or bisulfite.

The silver complex found in most photographic processing solutions is known to exist as a stable, soluble silver-thiosulfate complex. The complex typically forms by the reaction of silver bromide with ammonium thiosulfate during photograph development. The most frequently used methods for removing silver-thiosulfates from solution include: (a) chemical replacement cartridges wherein iron replaces silver when the solution is passed through stainless steel wool; and (b) conventional ion exchange resins. In U.S. Pat. No. 4,394,354, it is further taught that activated carbon which has been impregnated with at least about 0.1 wt. % halogen acts as an adequate silver ion remover. Similar improvements may be realized by impregnating halogens into such non-carbon adsorbents as natural or synthetic zeolites, activated alumina, activated silica, Fuller's earth, bentonite clay and hectorite clay, according to U.S. Pat. No. 4,396,585.

For some time now, it has become important to remove silver from waste water streams for health and environmental reasons. The subsequent recovery of precious metals has also increased in economic importance. It is well known that ionic silver can be recovered from photographic processing solutions by the electrolytic methods disclosed in U.S. Pat. Nos. 4,026,784, 4,111,766 and 4,166,781. Typically, such recovery methods were only used for solutions containing greater than 500 ppm silver since it was extremely difficult to reduce silver concentrations below about 500 ppm by electrolysis. Other disadvantages with these methods include the high expenditures and continuous monitoring requirements for such systems.

Citric acid and ethylenediamine tetraacetic acid (EDTA) have been used as chelating agents for many years in metal electroplating, electroless plating, various wood or pulp treatments and as a scale remover/controller for equipment cleaning. As a result, metal-citrate and metal-EDTA complexes often abound in the waste waters of industries employing such chelating agents, chelators or ligands. Metal-citrate complexes also exist in the water runoffs of areas where the ground is rich in citric acid deposits. Several known processes for removing and recovering from solution metal complexes of this variety are discussed in an article by Spearot et al entitled "Recovery Process for Complexed Copper-Bearing Rinse Waters", *Environmental Progress*, Vol. 3, no. 2, pp. 124–128 (1984). The disadvantages associated with respective recovery processes are also discussed therein. Elsewhere, U.S. Pat. No. 4,157,434 discloses a method for removing metal-EDTA complexes from a polyphenylene ether resin solution. The method includes contacting the solution with alumina to selectively adsorb the metal-EDTA thereon.

In a Chibwe et al article entitled "Intercalation of Organic and Inorganic Anions into Layered Double Hydroxides", *Journal of Chemical Society, Chemical Communications*, No. 14, pp. 926–927 (July 15, 1989), there is disclosed a process for intercalating several specific anions, including iron cyanide, into a hydrotalcite-like compound. The process exposes heat-treated layered double hydroxides (LDH's) to an anionic solution before centrifugation and distilled water washing.

SUMMARY OF THE INVENTION

It is a principal object of this invention to provide an improved method for reducing the amount of anionic metal-ligand complex in a solution. It is a further object to provide efficient means for treating a solution which contains environmentally unacceptable amounts of one or more anionic metal-complexes (or chelates). Preferred embodiments of this invention are capable of lowering the amount of metal-cyanide, metal-thiocyanate, metal-thiosulfate, metal-citrate and/or metal-EDTA complex in an aqueous solution to below about 1 ppm, or even below about 0.1 ppm, when measured on a metal ion basis.

It is a further object of this invention to provide a method for removing substantially all metal complexes including metal-cyanide, metal-thiocyanate, metal-thiosulfate, metal-citrate, metal-gluconate, metal-tartarate, metal-lactate, metal-acetate, metal-succinate, metal-glycolate and/or metal-EDTA from a solution containing one or more of the same. It is a further object to provide an uncomplicated method for removing metal-ligand complexes from a solution by adding complex-adsorbing substance to the solution or by passing the solution through a containment of this substance. It is still a further object to provide a method for removing chelates from such waste water streams as photographic processing solutions, metal electroplating and electroless plating solutions, mining and ore recovery solutions or the like, by merely contacting such streams with a complex-adsorbent consisting essentially of hydrotalcite, calcined hydrotalcite or mixtures thereof.

It is a further object of this invention to provide a method for adsorbing metal-ligand complexes, which method is stable and effective in alkaline pH ranges where anion adsorption is typically difficult. It is a further object to provide a waste water treatment method which avoids generating substantial quantities of environmentally unacceptable by-products. The complex-containing substance resulting from preferred embodiments of this invention produces very little to no leachate of metal complex (or other toxic materials) over extended periods of time. It is still a further object of this invention to provide a metal complex reduction method which requires no special equipment to practice at any given mine site or industrial scale water treatment facility. It is a further object of this invention to overcome the problems and disadvantages associated with the other treatment methods mentioned above.

In accordance with the foregoing objects of this invention, and other advantages which will become apparent from the detailed description of the preferred embodiments which follows, there is provided a method for reducing the amount of anionic metal-ligand complex in a solution. The method commences by contacting the solution with a substance selected from: a compound having the formula:

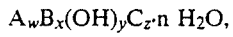

wherein A represents a divalent metal cation, B represents a trivalent metal cation, C represents a mono- to tetravalent anion, and w, x, y, z and n satisfy the following conditions: $0 \leq z \leq x \leq 4 \leq w \leq \frac{1}{2}y$ and $12 \geq n \geq \frac{1}{2}(w-x)$; a calcined product of this compound or mixtures thereof. The method then proceeds by separating saturated or complex-containing substance from the purified solution. In preferred embodiments, the solution-contacting compound is selected from the group consisting of natural or synthetic hydrotalcite, pyroaurite or takovite. Most preferably, complex-containing solutions are contacted with sufficient amounts of calcined hydrotalcite to remove substantially all such metal complexes therefrom.

The invention further provides a method for removing substantially all metal-cyanide, metal-thiocyanate, metal-thiosulfate, metal-citrate and/or metal-EDTA complexes from photographic processing solutions, metal electroplating and electroless plating solutions, mining and ore-recovery solutions, or other waste water streams. The method comprises: contacting the solution with a sufficient amount of complex-adsorbing substance consisting essentially of a compound selected from hydrotalcite, calcined hydrotalcite and mixtures thereof.

BRIEF DESCRIPTION OF THE DRAWINGS

Further features, other objects and advantages of this invention will become clearer from the following detailed description of preferred embodiments made with reference to the drawings in which.

DETAILED DESCRIPTION OF THE PREFERRED EMBODIMENTS

Figure 1A:
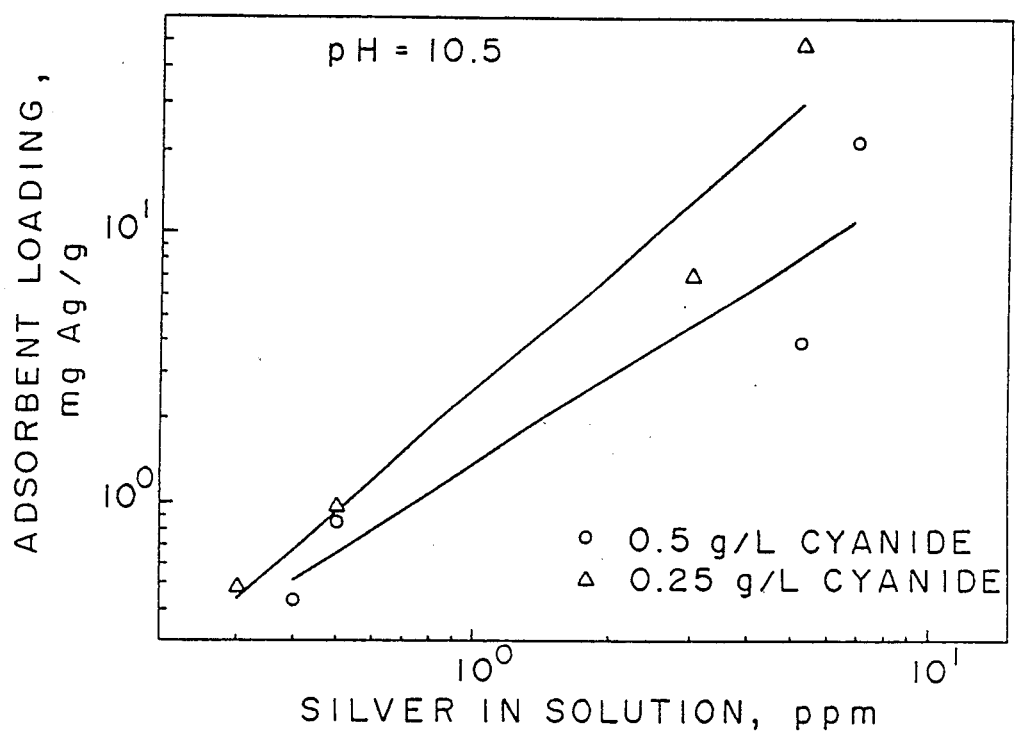
FIG. 1a shows adsorption isotherms of calcined hydrotalcite for silver-cyanide complexes, as expressed by the adsorbent loading capacity of silver ions versus silver concentration in solution.

In the detailed description of preferred embodiments which follows, repeated reference is made to the adsorption of metal-ligand complexes (or chelates) from waste water solutions using sufficient amounts of a compound selected from hydrotalcite, calcined hydrotalcite or mixtures thereof. As used for purposes of this invention, the term "ligand" shall mean a molecule, ion or atom: (a) which is capable of independent existence as a stable chemical species; and (b) which attaches to the central atom of a coordination compound, chelate or other complex. Exemplary ligands include the ammonia molecules in $[CO(NH_3)_6]^{3+}$, the chlorine atoms of $[PtCl_6]^{2-}$ and the cyanide from $Fe(CN)_6^{3-}$. Ligands such as EDTA, which are also referred to as complexing agents, do not include the mere attachments to metal ions which are incapable of independent existence as a stable chemical species. The oxygen from chromate $(CrO_4^{2-})$, for example, cannot stand alone as $O_4$. Hence, $O_4$ is not a "ligand", nor is chromate a "metal-ligand complex" as defined above.

It is to be understood that this invention may also be practiced with other compounds belonging to the same family as hydrotalcite, said family consisting of any compound having the formula: $A_wB_x(OH)_yC_z \cdot nH_2O$, wherein A represents a divalent metal cation, B represents a trivalent metal cation, C represents a mono- to tetravalent anion, and w, x, y, z and n satisfy the following conditions or equations: $0 \leq z \leq x \leq 4 \leq w \leq \frac{1}{2}y$ and $12 \geq n \geq \frac{1}{2}(w-x)$. Preferred embodiments of compounds from this same family have also been identified by the formula: $A_6B_2(OH)_{16}C \cdot 4H_2O$, wherein A is selected from the group consisting of: $Mg^{2+}$, $Ni^{2+}$, $Fe^{2+}$ and $Zn^{2+}$; B is selected from: $Al^{3+}$, $Fe^{3+}$ and $Cr^{3+}$; and C is preferably selected from a list of anions which includes: $OH^-$, $Cl^-$, $Br^-$, $NO_3^-$, $CH_3COO^-$, $CO_3^{2-}$, $SO_4^{2-}$, $PO_4^{3-}$, $Fe(CN)_6^{3-}$ and $Fe(CN)_6^{4-}$. In some references, all compounds which satisfy the foregoing formulae have been collectively referred to as "hydrotalcites". In other situations, this family of compounds is divided into various subgroups depending on the divalent and trivalent cations which comprise every other layer of the complex-adsorbing structure. For example, pyroaurites have the basic formula: $Mg_6Fe_2OH_{16}CO_3 \cdot 4H_2O$. (Such compounds have also been referred to as "sjogrenites".) Takovites, on the other hand, consist essentially of a compound having the formula: $Ni_6Al_2OH_{16}CO_3 \cdot 4H_2O$. For convenience purposes, however, the remainder of this detailed description will refer to the selective removal of metal-ligand complexes using exemplary hydrotalcite-type compounds only.

As used herein, the term "hydrotalcite" shall mean any natural or synthetic compound which satisfies the formula: $Mg_6Al_2(OH)_{16}CO_3 \cdot 4H_2O$, or, as rewritten: $6MgO \cdot Al_2O_3 \cdot CO_2 \cdot 12H_2O$. In its ionic form, hydrotalcite appears as: $[Mg_6Al_2(OH)_{16}]^{2+} \cdot [CO_3]^{2-} \cdot 4H_2O$. The main structural unit for hydrotalcite is basically that of brucite, or magnesium hydroxide $(Mg(OH)_2)$. More particularly, the hydrotalcite structure consists of sheets of magnesium hydroxide octahedrons having an Mg ion at the center of multiple (OH) ions which share adjacent edges. By substituting a trivalent aluminum cation for some fraction of the divalent magnesium ions, layers of magnesium and aluminum components are created which still maintain the basic sheet-like structure of brucite. To compensate for any resulting charge imbalances, additional anions C are intercalated between Mg-Al layers and into this sheet-like structure. Through the formation of hydrogen bonds, anions C and water molecules form interlayers of $(C \cdot nH_2O)$ between the brucite-like layers. The anion which has the greatest affinity for combining to form such hydrotalcite interlayers is carbonate $(CO_3^{2-})$.

The spacial distribution of carbonate ions within the hydrotalcite interlayer depends, in part, on how the $Al^{3+}$ substitute ions are positioned in the brucite. The water molecules which surround carbonate ions serve as "void fillers", therefore. The spacing between brucite-like layers is also a function of the amount or degree of aluminum substitution into the structure. Particularly, as aluminum substitution increases, interlayer spacing decreases due to an increase in the electrostatic attractions between positive hydroxide layers and negative interlayers. Interlayer thickness may also change depending upon the size and orientation of the various anions which may be exchanged for some or all of the carbonate ions within the hydrotalcite interlayer structure.

The compound, hydrotalcite, exists in both a natural and synthetic form. Naturally occurring deposits of hydrotalcite have been found in Snarum, Norway and in the Ural Mountains. Typical occurrences are in the form of serpentines, talc schists, or as an alteration product of spinel where, in some cases, hydrotalcite forms as pseudomorphs of the spinel. Like most ores and compounds, natural hydrotalcite is virtually impossible to find in a pure state. Natural deposits typically contain one or more other minerals, including but not limited to, penninite and muscovite, or combinations of undesirable heavy metal ions. Conventional practices recognize that it is practically impossible to remove all such incidental elements and impurities from natural hydrotalcite. In any event, known deposits of natural hydrotalcite remain very limited.

Several methods for making purer, synthetic hydrotalcite are also known. Such synthetic products may be produced as a fine powder, −20 mesh granules or as ⅛-inch diameter extrudates, among other forms. In U.S. Pat. No. 3,539,306, an aluminum component selected from aluminum hydroxide, aluminum-amino acid salts, aluminum alcoholate, water soluble aluminates, aluminum nitrate and aluminum sulfate, is mixed with a magnesium component selected from magnesium oxide, magnesium hydroxide and water-soluble magnesium salts, and a carbonate ion-containing compound in an aqueous medium maintained at a pH of 8 or more. The resulting hydrotalcite product is used as an antacid therein.

Other known methods for synthesizing hydrotalcite include: adding dry ice or ammonium carbonate (a) to a mixture of magnesium oxide and alpha-alumina or (b) to a thermal decomposition product from a mixture of magnesium nitrate and aluminum nitrate and thereafter maintaining the system at temperatures below about 325° F. and at elevated pressures between 2,000 and 20,000 psi. Such processes are not practical for industrial scale production of hydrotalcite, however, due to the high pressures employed therein. The use of such high pressures has also caused compounds other than hydrotalcite to form, said other compounds including brucite, boehmite, diaspore and hydromagnesite. Still other processes for producing synthetic hydrotalcites are disclosed in an article entitled "Properties of a Synthetic Magnesium-Aluminum Carbonate Hydroxide and its Relationship to Magnesium-Aluminum Double Hydroxide Manasseite, and Hydrotalcite", *The American Mineralogist*, Vol. 52, pp. 1036–1047 (1967). In this article, Ross et al. describe a process for producing hydrotalcite-like material by titrating a mixed solution of $MgCl_2$ and $AlCl_3$ with NaOH in a carbon dioxide-free system. The suspension is then dialyzed for 30 days at 60° C. to form a hydrated Mg-Al carbonate hydroxide having both manasseite and hydrotalcite properties.

In preferred embodiments of this invention, the improved adsorption method consists of contacting waste water streams, effluent or other complex-contaminated solutions with a substance consisting essentially of calcined hydrotalcite. By use of the term "consisting essentially of" herein, it is meant that the substance should contain greater than about 85 or 90%, and more preferably greater than about 95 or 98%, of the calcined (or activated) form of hydrotalcite. It is to be understood, however, that physical processes are not often perfect such that every last vestige of incidental elements and impurities may be omitted from a substance which may be considered suitable for use as an adsorbent according to the invention. In its dehydrated state, calcined hydrotalcite is believed to resemble a product having the formula: $Mg_6Al_2O_8(OH)_2$.

The heat treatment of natural or synthetic hydrotalcite typically produces a better metal-complex adsorbent than its untreated equivalent. Such heat treatment may be carried out in any conventional or newly-developed heating media maintained at one or more temperatures between about 400°–650° C., although temperatures as low as 300° C. may also suffice. Preferred activation temperatures between about 400°–450° C. tend to maximize the adsorbent's surface area and pore volume, while heating to temperatures at or above 800° C. appears to detrimentally affect calcined hydrotalcite's overall adsorptivity.

Upon thermal activation of hydrotalcite, a porous, skeletal structure is produced from which some, if not all, water and carbonate ions have been expelled. The resulting adsorbent has an average pore diameter of about 55 angstroms and with some pores as large as about 170Å. The skeletal (or solid component) density of this calcined substance is about 2.9 g/cm$^3$ and its total pore volume about 0.3 cm$^3$/g. Upon calcination, hydrotalcite's specific surface area, as determined by the BET nitrogen adsorption method, increases from about 20 m$^2$/g to between about 50–200 m$^2$/g.

In one embodiment of this invention, the method for treating a solution which contains environmentally unacceptable amounts of one or more anionic metal-ligand complexes comprises: (a) providing a compound having the formula $A_6B_2(OH)_{16}C\cdot 4H_2O$, wherein A is selected from the group consisting of $Mg^{2+}$, $Ni^{2+}$, $Fe^{2+}$ and $Zn^{2+}$; B is selected from: $Al^{3+}$, $Fe^{3+}$ and $Cr^{3+}$; and C is selected from: $OH^-$, $Cl^-$, $Br^-$, $NO_3^-$, $CH_3COO^-$, $CO_3^{2-}$, $SO_4^{2-}$, $PO_4^{3-}$, $Fe(CN)_6^{3-}$ and $Fe(CN)_6^{4-}$; and (b) contacting the solution with a sufficient amount of this compound to reduce its metal complex content below about 1 ppm, more preferably below about 0.1 ppm, as measured on a metal ion basis. More preferably, this method further includes the step of: calcining the compound at one or more temperatures between about 400°–650° C. prior to contact with the solution per recitation (b) above. Optionally, this method may further proceed by separating complex-saturated compound from the solution using known or subsequently developed separation means.

In an alternative embodiment, a method for removing substantially all metal-ligand complex from a solution containing said complex comprises: contacting the solution with one of the complex-adsorbing substances described earlier herein; then separating the substance from the solution. Preferably, only substance which is saturated (or fully loaded) with complex should be removed from the solution while undesirable levels of complex remain. Then, once the complex content of said solution has been satisfactorily reduced, the remainder of unused substance may be separated from the solution for possible later reuse.

In preferred embodiments, the aforementioned methods are typically practiced by adding a powdered form of calcined hydrotalcite directly to the solution to be treated. The amount of powder to be added may be predetermined externally by testing a representative sample of the solution for the amount of adsorbent needed to remove substantially all complex therefrom. Saturated substance may then be removed from this solution by one or more known or subsequently developed techniques including filtration, gravity settling and centrifugation. Alternatively, hydrotalcite may be combined with one or more binder materials, then extruded, formed or otherwise shaped into particles of larger sizes, including granules or the like, before or after calcination. Such larger particles may then be positioned in a column, fluidized bed or other layered containment device for passing solution therethrough. In either event, the basic invention proceeds with little regard for reaction system pH and/or temperature. The pH of most every solution to which calcined hydrotalcite is added becomes sufficiently basic for complex adsorption to occur. Should the solution pH remain below about 4 after hydrotalcite addition, complex adsorption may not proceed according to the invention. Such conditions only exist in acidic solutions having a high buffering capacity, however. Metal-ligand complexes may be removed from solutions according to the invention at one or more temperatures between room temperature and the solution boiling point. Preferred embodiments may further remove such metal complexes at temperatures up to about 650° C., with higher temperatures possibly enhancing adsorptivity and/or overall adsorption efficiency.

The method of this invention may also be used to make waste water which contains one or more complexes of: metal-cyanide, metal-thiocyanate, metal-thiosulfate, metal-citrate and metal-EDTA, environmentally more acceptable by reducing the amount of complex therein. Particularly, the invention is capable of reducing the complex contents of such waste water streams as photographic processing, metal electroplating, electroless plating, mining and ore recovering solutions, to below about 1 ppm, preferably below about 0.5, 0.3 or 0.1 ppm, and most preferably to levels at or below about 50 parts per billion (as measured on a metal ion basis).

The substance into which the complex adsorbs, itself becomes environmentally acceptable. By this term, it is meant that the invention will have physically and chemically adsorbed entire metal complexes into, rather than onto, the structure of said substance in order to effectively encapsulate the hazardous or toxic complexes between stable layers of brucite, or other environmentally acceptable materials. Provided that it will not be dissolved in an acidic solution at pH's below about 4 or 5, such saturated substances will remain environmentally safe since it is otherwise impossible to leach unacceptable levels of hazardous metal complexes from a structure which has been rehydrated in the manner described hereinafter.

The foregoing methods are particularly relevant for removing such metal-ligand complexes wherein the metal of said complex is selected from silver, gold, barium, calcium, cadmium, copper, iron, magnesium, manganese, nickel, lead, caladium, platinum, radium, rhodium, tin, strontium, vanadium and zinc. The chelating agent, chelator or ligand (hereinafter "ligand") of the removed complex may be selected from the group consisting of cyanide, thiocyanate, thiosulfate, citrate and ethylenediamine tetraacetic acid (EDTA). It is to be understood that both of the aforementioned groups are merely exemplary, however, and not intended to limit the invention to removal of these complexing materials only. In fact, other ligands which may also be adsorbed according to the invention include: nitrilotriacetic acid (NTA), trans-1,2-cyclohexadiamine tetraacetic acid (cy-DTA), diethylenetriamine pentaacetic acid (DTPA), triethylenetetraamine hexaacetic acid (TTHA), glycoletherdiamine tetraacetic acid (GETA) and iminodiacetic acid (IDA).

Particular metal complexes (or chelates) which are capable of being removed from solution include: precious metal-cyanide, iron cyanide or precious metal-thiosulfate complexes such as $Au(CN)_2^-$, $Fe(CN)_6^{3-}$ and $Ag(S_2O_3)^-$ [or $Ag(S_2O_3)_2^{3-}$]. Other specific metal-ligand complexes removed by this invention include Cu-, Ni- and/or Zn-citrates. The invention may also be practiced to reduce the metal-EDTA content of a solution wherein the complexed metal is selected from silver, calcium, copper, iron, magnesium, nickel and zinc.

Generally speaking, the invention is more receptive to adsorbing metal-ligand complexes which are divalent, trivalent or higher, although calcined hydrotalcite is also capable of adsorbing monovalent complexes to a lesser degree. Without being limited as to any theory of operation, it is believed that the preferred embodiments of this invention proceed according to the following mechanism. Upon calcination (or activation), both carbonate and water are expelled from the basic hydrotalcite structure according to the formula:

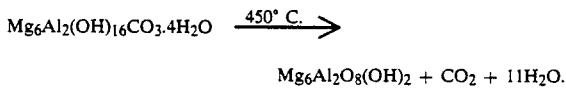

$$Mg_6Al_2O_8(OH)_2 + CO_2 + 11H_2O.$$

Contact of the calcined hydrotalcite with a complex-containing solution then causes the complex to occupy vacant anion positions within the adsorbent structure upon rehydration. Such physical adsorption results in a complex-adsorbing substance having between about 75–90%, and possibly as high as even 100%, of its theoretical maximum adsorption capacity. The foregoing mechanism also explains why this invention should proceed in environments which are substantially free of carbon dioxide or carbonates. Since carbonates were among those compounds expelled from hydrotalcite upon thermal activation, calcined hydrotalcite-type products will exhibit a greater affinity to re-adsorb the same before most other anions.

In the respective Figures which accompany this invention, adsorption isotherms were generated for showing the adsorption capacity of hydrotalcite or activated hydrotalcite for various exemplary metal-ligand complexes. For each complex illustrated, virtually all metal-ligands were capable of being absorbed through the addition of respective amounts of complex-adsorbing substance. Some complexes adsorbed more readily than others, however.

Figure 1B:
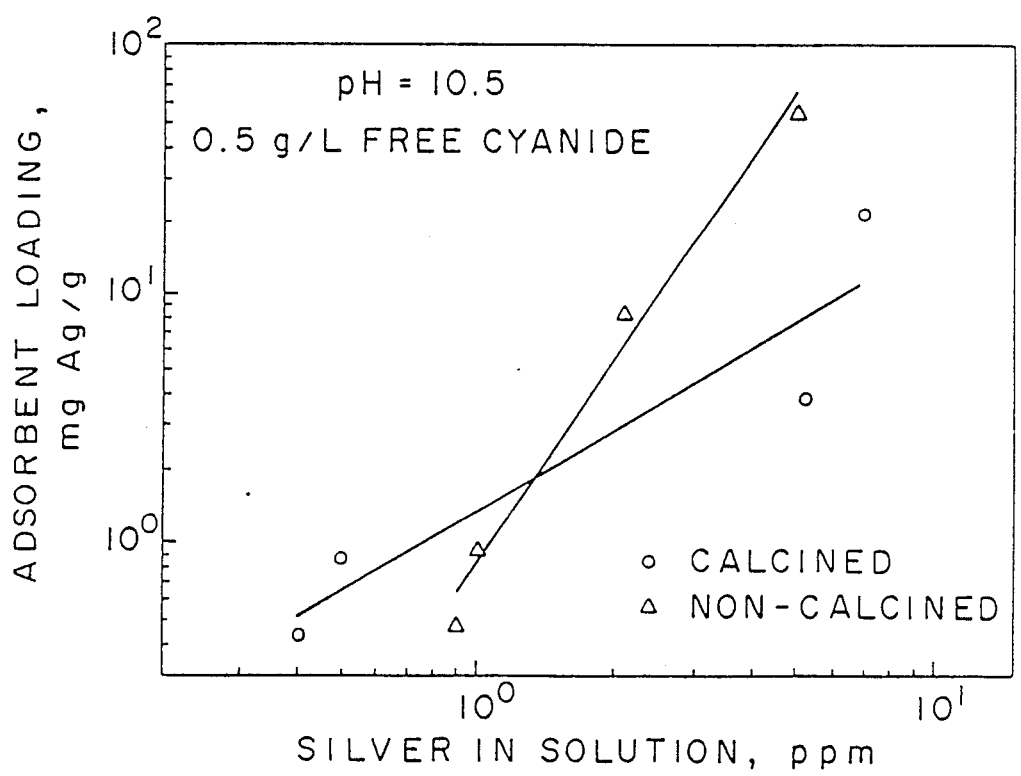
FIG. 1b compares the adsorption isotherm of calcined hydrotalcite with that of non-calcined hydrotalcite for silver-cyanide complexes.

In the graph at FIG. 1a, there is shown along the y-axis, the various amounts (mg) of silver loading on calcined hydrotalcite (g) in equilibrium with a solution containing various amounts (ppm) of silver (x-axis). Of the two systems shown and tested in FIG. 1a, the solution which contained 0.25 g/L of total cyanide, including complexed and free- or background-cyanide resulted in higher silver loading of calcined hydrotalcite adsorbent than the solution which contained about 0.5 g/L of total cyanide ions. (The resulting solution after adsorbent addition was measured to have a pH of about 10.5.) In FIG. 1b, the adsorption isotherm of calcined hydrotalcite is plotted against that of non-calcined hydrotalcite for silver-cyanide removal. As can be seen from this illustration, both adsorbents perform admirably at pH's of about 10.5.

Figure 2:
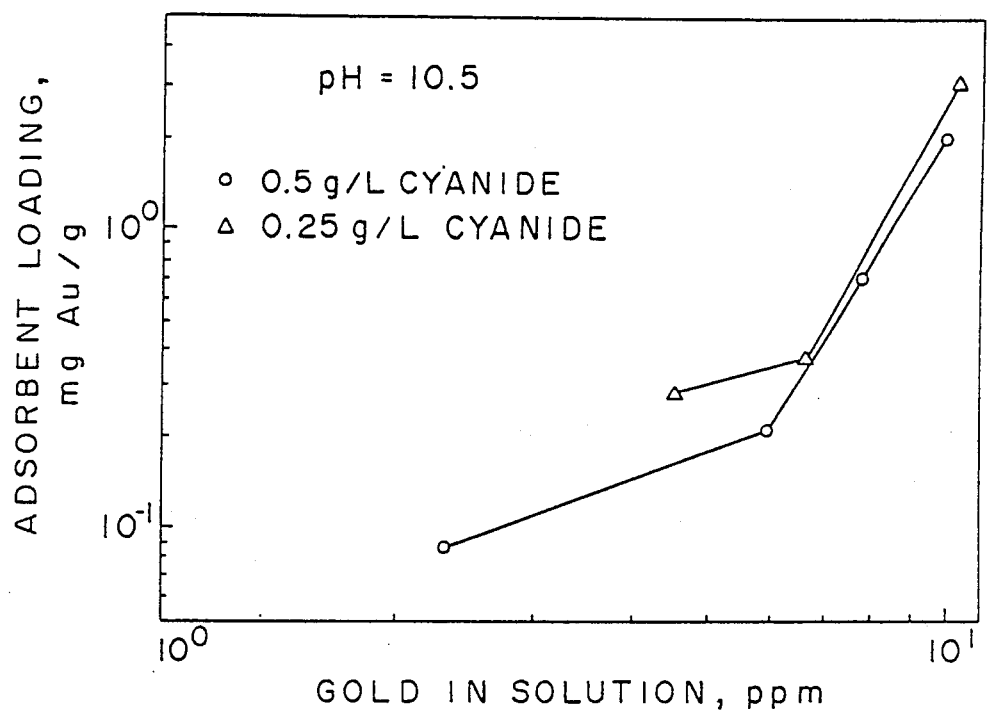
FIG. 2 shows adsorption isotherms of calcined hydrotalcite for gold-cyanide complexes, as expressed by the adsorbent loading of gold versus its concentration in solution.

For FIG. 2, calcined hydrotalcite adsorbent was added in various loading amounts to solutions containing gold-cyanide complexes. Again higher surface loadings on the adsorbent were observed for solutions containing 0.25 g/L of gold-cyanide versus the solutions which contained about 0.5 g/L of the same complex.

Figure 3A:
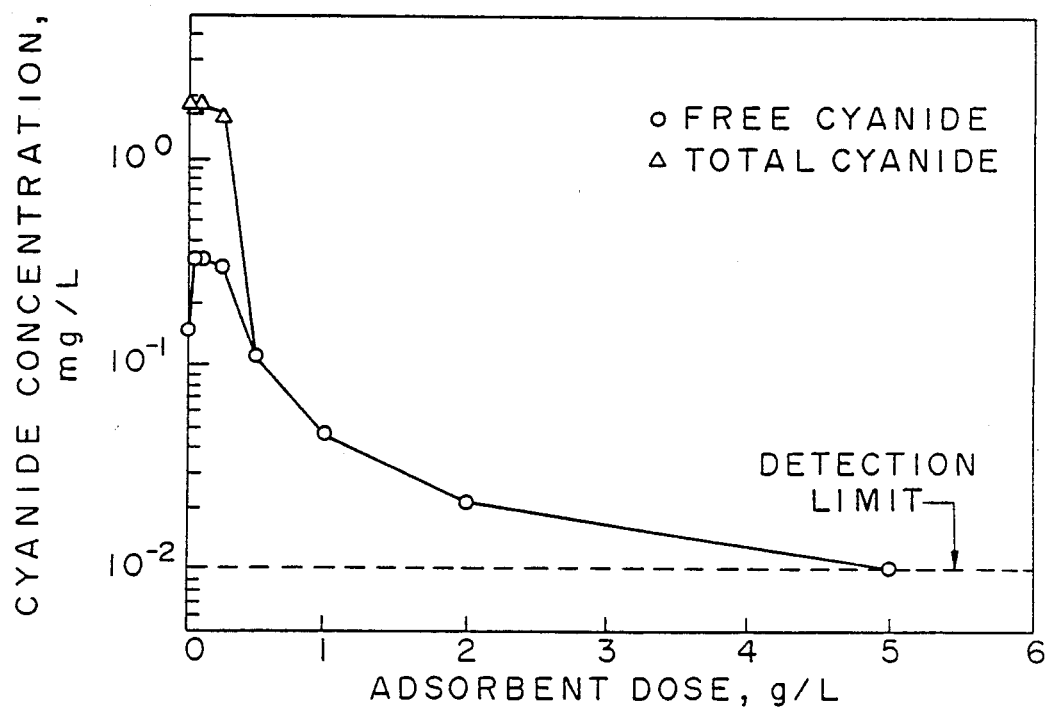
FIG. 3a is an isotherm plotting the amount of fixed and free iron-cyanide removed with calcined hydrotalcite in a beaker test.
Figure 3B:
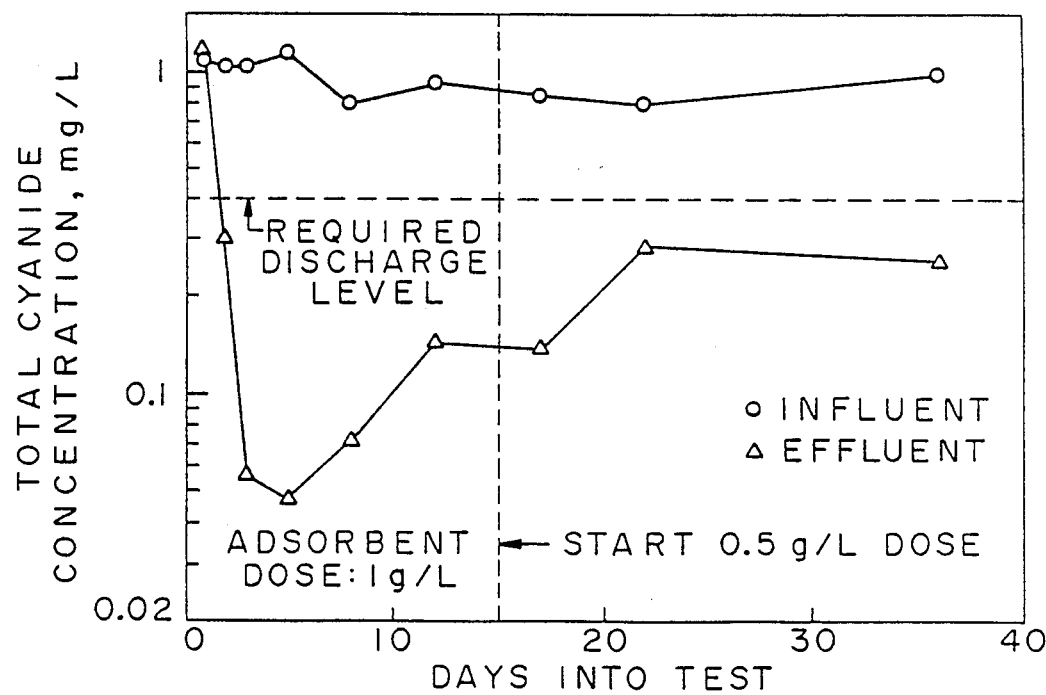
FIG. 3b is an isotherm plotting the total cyanide removed from a full scale field trial.

FIG. 3a contains the beaker results on total and free cyanide content of treated water after various dosages of calcined hydrotalcite have been added to the solution. From this Figure, it can be seen that complete removal of the iron or fixed cyanide (i.e., total cyanide less free cyanide) is achieved at low adsorbent dosages because it exists as an anionic ligand complex (FeCN$_6$). A still higher dosage of this same adsorbent removes all residual free cyanide from solution. Using information gained from the above laboratory study, a full-scale field trial of this same adsorbent, activated hydrotalcite, was conducted. The objective of this test was to reduce the total cyanide content of process effluent to less than 0.4 mg/L. The field trial lasted over 35 days and, as evident from FIG. 3b, total cyanide removal to below target concentration was achieved throughout the entire test.

Figure 4:
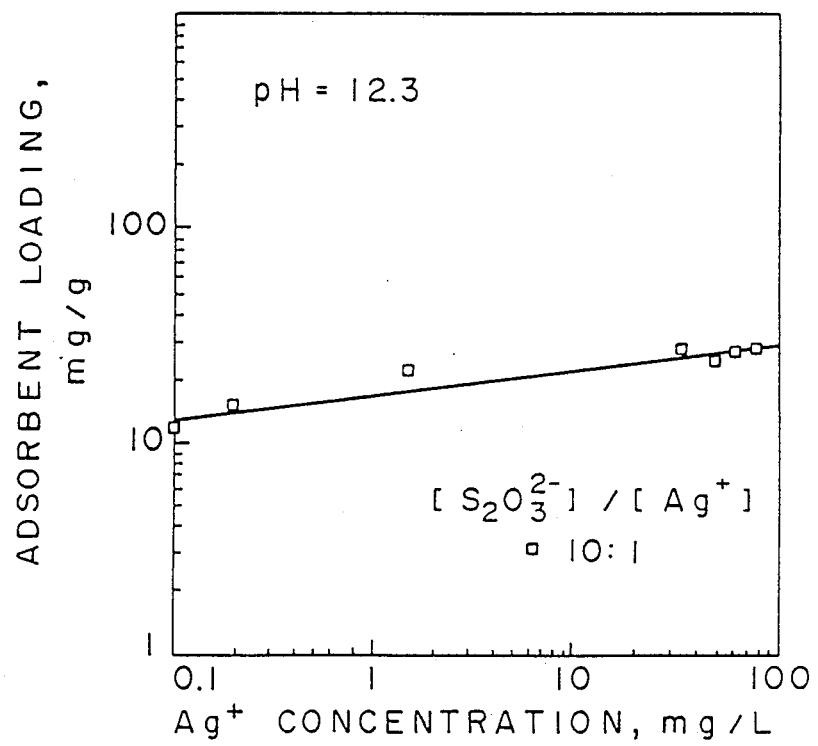
FIG. 4 is an adsorption isotherm plotting the amount of silver-thiosulfate complex adsorbed by calcined hydrotalcite according to one embodiment of the invention.

FIG. 4 compares the amount of silver-thiosulfate complex adsorbed by calcined hydrotalcite in solutions of various silver concentrations, at a pH of 12.3 and total thiosulfate to silver ion molar ratio of 10:1.

Figure 5:
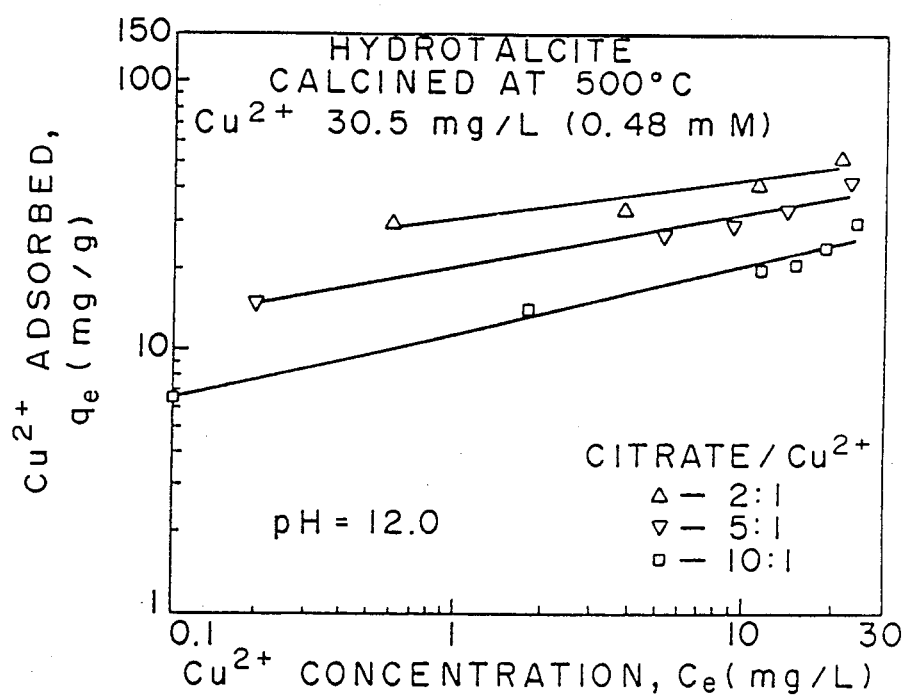
FIG. 5 shows adsorption isotherms of calcined hydrotalcite for copper-citrate complexes in solutions having various molar ratios of total citrate to copper ions.
Figure 6:
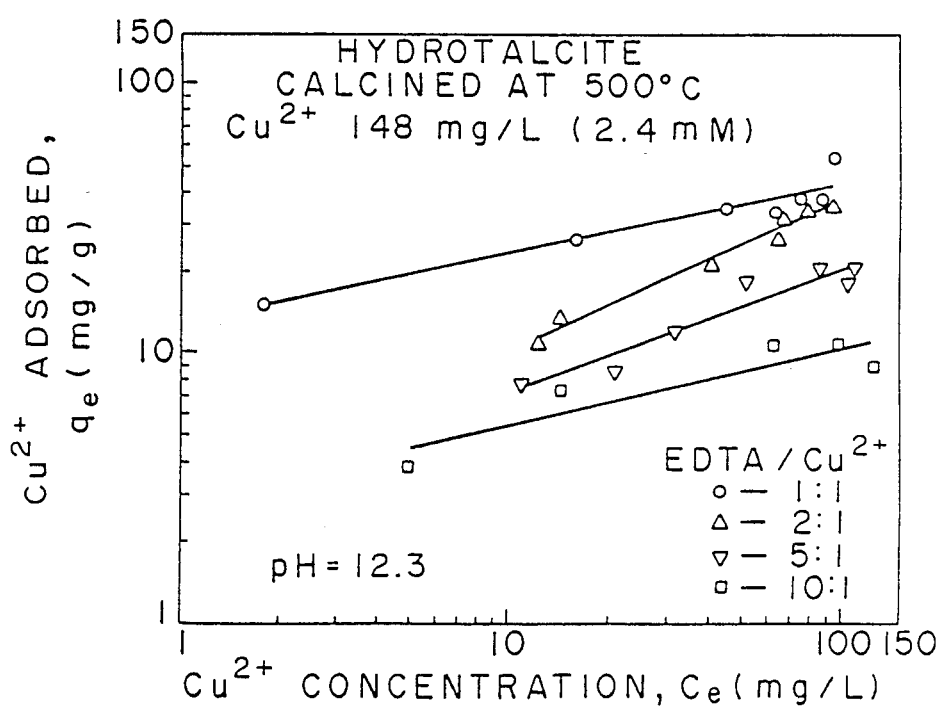
FIG. 6 shows adsorption isotherms of calcined hydrotalcite for Cu-EDTA complexes at various molar ratios of total EDTA to copper ions.
Figure 7:
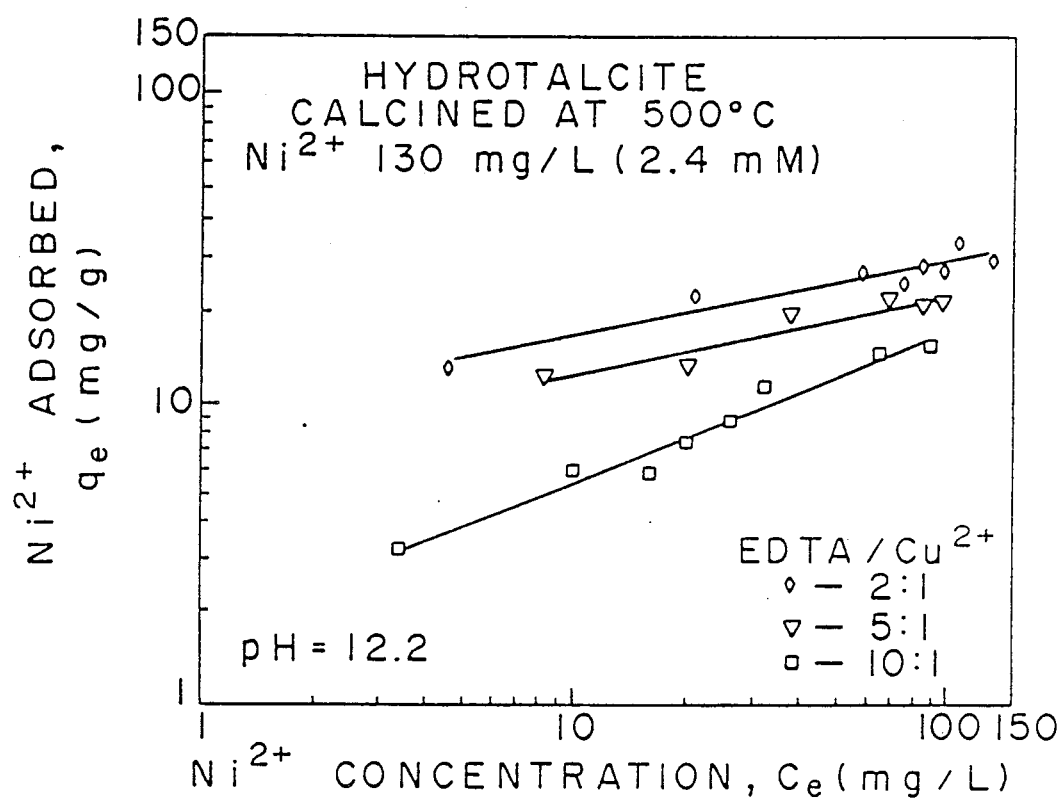
FIG. 7 shows adsorption isotherms of calcined hydrotalcite for Ni-EDTA complexes at various molar ratios of total EDTA to nickel ions.

FIG. 5 shows the adsorption isotherms of calcined hydrotalcite for copper-citrate complex-containing solutions having various molar ratios of total citrate to copper ions. FIGS. 6 and 7 illustrate the absorption of copper- and nickel-EDTA complexes on calcined hydrotalcite at various total EDTA to metal ion molar ratios.

From the foregoing figures, it can be seen that both calcined and non-calcined hydrotalcite have an exceptional ability to adsorb metal-ligand complexes, especially at alkaline pH's. At relatively low concentration levels, calcined hydrotalcite's capacity for removing from solution metal-complexes or chelates remains very high. The presence of excessive amounts of free or uncomplexed ligands somewhat reduces adsorption capacity, however, indicating that some competitive adsorption of free ligand ions exists on the surface sites of calcined hydrotalcite.

Having described the presently preferred embodiments, it is to be understood that the invention may be otherwise embodied within the scope of the appended claims which follow.

What is claimed is:

1. A method for reducing the amount of an anionic metal-ligand complex in a solution, the ligand of said complex comprising a molecule, ion or atom capable of independent existence as a stable, chemical species and which ligand attaches to the central atom of a coordination compound, chelate or other complex, and the metal of said complex being selected from: Ag, Au, Ba, Ca, Cd, Cu, Fe, Mg, Mn, Ni, Pb, Pd, Pt, Ra, Rh, Sn, Sr, V and Zn, said method comprising:

(a) contacting the solution with a substance selected from: a compound having the formula $A_wB_x(OH)_yC_z\cdot nH_2O$, wherein A represents a divalent metal cation, B represents a trivalent metal cation, C represents a mono- to tetravalent anion, and w, x, y, z and n satisfy the following: $0 \leq z \leq x \leq 4 \leq w \leq \frac{1}{2}y$ and $12 \geq n \geq \frac{1}{2}(w-x)$; a calcined product of said compound and mixtures thereof; and (b) separating the substance from the solution.

2. The method of claim 1 wherein the compound has the formula: $A_6B_2(OH)_{16}C\cdot 4H_2O$.

3. The method of claim 2 wherein A is selected from the group consisting of: $Mg^{2+}$, $Ni^{2+}$, $Fe^{2+}$ and $Zn^{2+}$; B is selected from: $Al^{3+}$, $Fe^{3+}$ and $Cr^{3+}$; and C is selected from: $OH^-$, $Cl^-$, $Br^-$, $NO_3^-$, $CH_3COO^-$, $CO_3^{2-}$, $SO_4^{2-}$, $PO_4^{3-}$, $Fe(CN)_6^{3-}$ and $Fe(CN)_6^{4-}$.

4. The method of claim 1 wherein the compound is selected from: natural hydrotalcite, synthetic hydrotalcite, pyroaurite and takovite.

5. The method of claim 1 wherein the substance consists essentially of calcined hydrotalcite.

6. The method of claim 1 wherein the ligand of said complex is selected from: gluconate, tartarate, lactate, acetate, succinate and glycolate.

7. The method of claim 1 wherein the ligand of said complex is selected from: cyanide, thiocyanate, thiosulfate, citrate and ethylenediamine tetraacetic acid (EDTA).

8. The method of claim 7 wherein the complex to be removed is a precious metal-cyanide.

9. The method of claim 7 wherein the complex to be removed is iron-cyanide.

10. The method of claim 7 wherein the complex to be removed is silver- or gold-thiosulfate.

11. The method of claim 7 wherein the complex to be removed is Cu-, Ni- or Zn-citrate.

12. The method of claim 7 wherein the complex to be removed is a metal-EDTA complex, said metal being selected from: Ag, Ca, Cu, Fe, Mg, Ni and Zn.

13. The method of claim 1 wherein recitation (a) includes:
adding a sufficient amount of substance to the solution to remove the complex therefrom.

14. The method of claim 1 wherein recitation (a) includes:
passing the solution through a containment consisting essentially of the substance.

15. The method of claim 1 wherein recitation (b) includes:
removing substance from the solution by one or more of: filtration, gravity settling and centrifugation.

16. A method for treating a solution which contains an environmentally unacceptable amount of anionic metal-ligand complex, the ligand of said complex comprising a molecule, ion or atom capable of independent existence as a stable, chemical species and which ligand attaches to the central atom of a coordination compound, chelate or other complex, and the metal of said complex being selected from: Ag, Au, Ba, Ca, Cd, Cu, Fe, Mg, Mn, Ni, Pb, Pd, Pt, Ra, Rh, Sn, Sr, V and Zn, said method comprising:

(a) providing a compound having the formula $A_6B_2(OH)_{16}C \cdot 4H_2O$, wherein A is selected from the group consisting of: $Mg^{2+}$, $Ni^{2+}$, $Fe^{2+}$ and $Zn^{2+}$; B is selected from: $Al^{3+}$, $Fe^{3+}$ and $Cu^{+3}$; and C is selected from: $OH^-$, $Cl^-$, $Br^-$, $NO_3^-$, $CH_3COO^-$, $CO_3^{2-}$, $SO_4^{2-}$, $PO_4^{3-}$, $Fe(CN)_6^{3-}$ and $Fe(CN)_6^{4-}$; and (b) contacting the solution with a sufficient amount of the compound for reducing its complex content to below about 1 ppm.

17. The method of claim 16 which further comprises calcining the compound at one or more temperatures between about 400°-650° C. prior to recitation (b).

18. The method of claim 16 which further comprises:
(c) removing complex-saturated compound from the solution.

19. The method of claim 16 wherein the ligand is selected from: cyanide, thiocyanate, thiosulfate, citrate and ethylenediamine tetraacetic acid (EDTA), gluconate, tartarate, lactate, acetate, succinate and glycolate.

20. The method of claim 16 wherein recitation (b) includes:
contacting the solution with a sufficient amount of the compound for reducing its complex content to below about 0.1 ppm.

21. A method for removing metal-cyanide complex from an aqueous solution comprises:
contacting the solution with a sufficient amount of substance consisting essentially of a compound selected from: hydrotalcite, calcined hydrotalcite and mixtures thereof; and
separating the substance from the solution.

22. The method of claim 21 wherein the complex to be removed is an iron-cyanide.

* * * * *